United States Patent [19]
Kemper

[11] Patent Number: 5,967,283
[45] Date of Patent: Oct. 19, 1999

[54] CLUTCH SPRING ASSEMBLY

[76] Inventor: Yves J. Kemper, 25 Av. Juste Olivier, 1006 Lausanne, Switzerland

[21] Appl. No.: 08/984,643

[22] Filed: Dec. 3, 1997

Related U.S. Application Data

[60] Provisional application No. 60/033,217, Dec. 4, 1996.

[51] Int. Cl.⁶ ............................ F16D 13/71; F16D 13/50
[52] U.S. Cl. .................................... 192/89.23; 192/89.25; 192/109 A
[58] Field of Search ............................ 192/70.27, 89.23, 192/89.25, 109 A; 267/161

[56] References Cited

U.S. PATENT DOCUMENTS

| | | |
|---|---|---|
| 3,323,624 | 6/1967 | Maurice . |
| 3,868,100 | 2/1975 | Maucher . |
| 4,602,708 | 7/1986 | Nagano . |
| 4,623,055 | 11/1986 | Ohkubo . |
| 4,696,384 | 9/1987 | Huber . |
| 4,949,829 | 8/1990 | Tojima et al. . |
| 5,088,583 | 2/1992 | Takeuchi et al. . |
| 5,148,904 | 9/1992 | Takashi et al. . |
| 5,236,070 | 8/1993 | Simoncic et al. . |
| 5,314,051 | 5/1994 | Marie et al. ...................... 192/70.27 X |
| 5,333,713 | 8/1994 | Hagnere et al. ................. 192/70.27 X |
| 5,400,887 | 3/1995 | Mizukami et al. . |
| 5,409,091 | 4/1995 | Reik et al. . |
| 5,551,547 | 9/1996 | Mizukami et al. . |
| 5,579,881 | 12/1996 | Weidinger . |
| 5,628,389 | 5/1997 | Wittmann et al. ............... 192/70.27 X |
| 5,671,834 | 9/1997 | Mizukami et al. .................. 192/89.23 |
| 5,794,753 | 8/1998 | Kemper ............................... 192/89.25 |
| 5,826,691 | 10/1998 | Asada et al. ..................... 192/70.27 X |

FOREIGN PATENT DOCUMENTS

| | | |
|---|---|---|
| 0 213 009 | 3/1987 | European Pat. Off. ............ 192/89.23 |
| 0 718 517 A1 | 6/1996 | European Pat. Off. . |
| 40 02 648 A1 | 8/1990 | Germany . |
| 2 287 994 | 4/1995 | United Kingdom . |

*Primary Examiner*—Rodney H. Bonck
*Attorney, Agent, or Firm*—Finnegan, Henderson, Farabow, Garrett & Dunner, LLP

[57] ABSTRACT

An actuator for a power transmitting friction clutch having a rotatable power input, a backplate rotatable with the power input, a pressure plate between the power input and the backplate, and an output connected friction cushion between the pressure plate and the power input. The actuator includes a diaphragm having an outer annulus defining a negative Belleville spring, and a plurality of radial control fingers extending inwardly from the outer annulus, the outer annulus having an outer periphery engageable with the pressure plate and an inner fulcrum edge. A positive spring unit is arranged in series with the negative Belleville spring between the inner fulcrum edge and the backplate. The diaphragm and the positive spring unit are supported in radial alignment on the backplate in a manner to provide unobstructed movement of the inner fulcrum edge of the diaphragm to load and unload the positive spring unit during actuation of the clutch.

10 Claims, 12 Drawing Sheets

CLUTCH SPRING ASSEMBLY

CROSS REFERENCE TO RELATED APPLICATIONS

This application claims the benefit of U.S. Provisional Application entitled CONTROLLED FORCE ACTUATOR SYSTEM, Ser. No. 60/033,21, filed Dec. 4, 1996, the disclosure of which is incorporated by reference. This application is related to U.S. applications Ser. No. 08/746,887, filed Nov. 15, 1996, and now U.S. Pat. No. 5,887,691; Ser. No. 08/791,524, filed Jan. 30, 1997, and now U.S. Pat. No. 5,794,753; and Ser. No. 08/888,832, filed Jan. 30, 1997, the disclosures of which are also incorporated by reference.

BACKGROUND OF THE INVENTION

1. Field of the Invention

This invention relates to clutch actuating systems, and, more particularly, to actuating systems for automotive clutches in which a largely conventional diaphragm spring is combined with a positive spring device to reduce control force needed for clutch actuation to a predictable, relatively small, and essentially constant force value.

2. Description of the Related Art

In pending U.S. applications Ser. No. 08/746,887, Ser. No. 08/791,524, and Ser. No. 08/888,832, the disclosures of which are incorporated by reference, control force actuating systems are disclosed in which a negative Belleville spring is arranged in series with a positive spring unit such that as force application energy is released from the negative Belleville spring, that energy is transferred between load and reaction members by the positive spring. The force/deflection characteristics of the negative Belleville spring and positive spring unit are related so that the difference in energy stored in the respective springs throughout a range of force application, remains substantially the same. As a result, the control force required to operate the actuating system is related to the stored energy difference and can be kept very small. The relatively small control force required for such actuating systems represents a significant step toward automated actuation of an automotive clutch, for example, by using state-of-the-art electromechanical transducers exemplified by an electromagnetic solenoid.

The diaphragm spring conventionally used in modern automotive clutches is typically configured with a continuous outer annulus defining a Belleville spring and joining with inwardly directed radial fingers to which an axial control force is applied. A diaphragm fulcrum is provided at the juncture between the inner edge of the outer annulus and the outer edges of the fingers. Also, a circular array of holes in the region of the fulcrum are used to support the diaphragm from the backplate or cover plate of the clutch on axial fulcrum rivets or pins. Fulcrum rings prevent movement of the diaphragm fulcrum axially on the pins while allowing the required amount of movement at the outer periphery of the annulus and at the inner ends of the control fingers. Such diaphragm springs enable high loads to be generated through small displacements and contribute to compactness and high torque transmitting capabilities.

SUMMARY OF THE INVENTION

An object of the present invention is to incorporate the described series arrangement of related negative Belleville and positive springs of the cited copending applications in the basic geometry of the conventional diaphragm spring.

Other objects, together with the advantages and purpose of the invention will be set forth in part in the description which follows, and in part will be obvious from the description, or may be learned by practice of the invention. The objects, advantages and purpose of the invention will be realized and attained by the elements and combinations particularly pointed out in the appended claims.

To attain the advantages and in accordance with the purpose of the invention, as embodied and broadly described herein, the invention concerns an actuator for a power transmitting friction clutch having a rotatable power input, a backplate rotatable with the power input, a pressure plate between the power input and the backplate, and an output connected friction cushion between the pressure plate and the power input. The actuator includes a diaphragm having an outer annulus defining a negative Belleville spring, and a plurality of radial control fingers extending inwardly from the outer annulus, the outer annulus having an outer periphery engageable with the pressure plate and an inner fulcrum edge. A positive spring unit is arranged in series with the negative Belleville spring between the inner fulcrum edge and the backplate. The diaphragm and the positive spring unit are supported in axial alignment on the backplate in a manner to provide unobstructed movement of the inner fulcrum edge of the diaphragm to load and unload the positive spring unit so that the absolute values of force between the negative Belleville spring and the pressure plate and force between the positive spring unit and the backplate remain substantially equal during actuation of the clutch.

Preferably, the positive spring unit is a positive Belleville spring having inner and outer edges and arranged so that the inner edge of the positive Belleville spring engages the fulcrum edge of the outer annulus of the diaphragm and the outer edge of the positive Belleville spring engages the backplate. Alternatively, the outer edge of the positive Belleville spring may engage the fulcrum edge of the outer annulus of the diaphragm. In this case, the inner edge of the positive Belleville spring engages the backplate.

In another aspect, the advantages and purpose of the invention are attained by the above described actuator in which the positive spring unit is integrated with the diaphragm. In this case, the positive spring unit comprises a plurality of leaf spring fingers lying between the control fingers and having inner and outer ends. One of the inner and outer ends of the positive spring fingers engage the backplate and the other of the inner and outer ends of the spring fingers are joined to a part of the diaphragm.

In yet another aspect the advantages and purpose of the invention are attained by the above described actuator arrangements in which the diaphragm and the positive spring unit are supported by axial projections on the backplate extending from proximal to distal ends toward the pressure plate. A stop at the distal ends of the axial projections limits movement of the inner fulcrum edge of the diaphragm outer annulus toward the pressure plate.

In still another aspect, the advantages and purpose of the invention are attained by the above described actuator arrangements in which the positive spring unit has a positive force/deflection ratio and is initially in an energy receiving condition and the negative Belleville spring has a negative force/deflection ratio and is initially in a loaded energy storing condition, so that movement of the control fingers effects a transfer of stored energy from the negative Belleville spring to the positive spring, thereby to apply a range of applied force between the backplate and the pressure plate. The range of applied force varies between minimum and maximum values of applied force, and the negative and positive force deflection ratios are related so that the absolute values of the force deflection ratios differ by a control force in the control fingers that remains substantially the same for changes in deflection of the positive and negative springs substantially throughout the applied range of forces. Preferably, the negative and positive force deflection ratios are further related so that the positive and negative springs are in equilibrium at the maximum value of applied force.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENTS

Figure 1A:
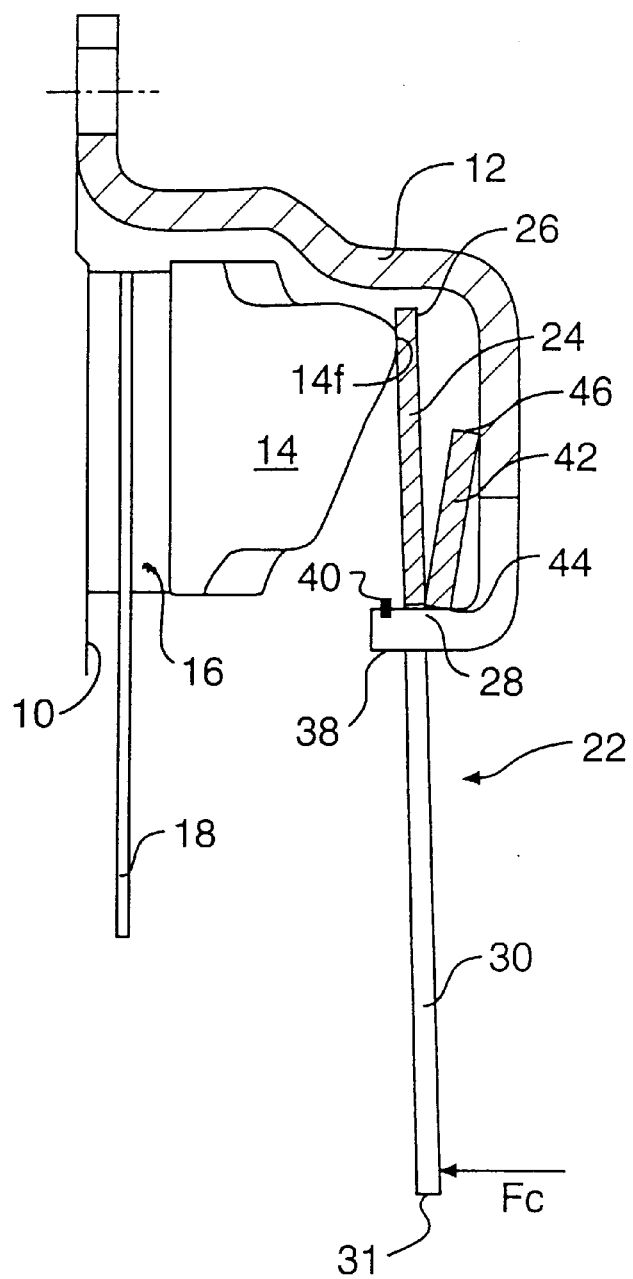
FIGS. 1A, 1B and 1C are fragmentary cross-sectional views illustrating the components of a first embodiment of the invention in different conditions of operation.

Reference will now be made in detail to the present preferred embodiments of the invention, examples of which are illustrated in the accompanying drawings. Wherever possible, the same reference numbers will be used throughout the drawings to refer to the same or like parts.

In accordance with the invention, an improved actuator is provided for a power transmitting clutch having an input provided by rotatable flywheel, a backplate rotatable with the flywheel, a pressure plate between the flywheel and the backplate, and an output connected to a conventional friction disc assembly, which may or may not be cushioned, located between the pressure plate and the flywheel. In each of FIGS. 1A–1C, FIGS. 4A–4C, FIGS. 5A–5C and FIGS. 7A–7C of the attached drawings, conventional components of a push-type automotive starting clutch are shown schematically to include a flywheel friction surface 10, a backplate 12 fixed directly for rotation with the flywheel, a pressure plate 14 connected by conventional straps (not shown) to the backplate 12 or to the flywheel and disposed for axial movement between the backplate 12 and the flywheel 10, a friction disc assembly 16 between the pressure plate 12 and the flywheel surface 10, and a power output member 18. All of these components are rotatable about a central axis 20 when the clutch is engaged to transmit power from the flywheel friction surface 10 to the output member 18. Such components are disclosed in U.S. Pat. No. 5,314,051, issued May 24, 1994, the disclosure of which is incorporated by reference.

The term "negative Belleville spring" is used herein and in the appended claims to designate a Belleville spring that is initially loaded with energy and that has a negative force/deflection ratio in that the force it exerts decreases with increased deflection. The characteristics of such a spring are fully described in the above cited copending U.S. patent applications and will not be further described herein except as those characteristics apply to the present invention.

The term "positive spring," as used herein and in the appended claims, is exemplified by a Belleville spring that has a positive force/deflection ratio in that the force it exerts increases with increased deflection. Such a "positive spring" may embodied as other types of springs which have a positive force/deflection ratio, such as leaf springs or a conventional coil spring. Also, the positive spring of the invention may be a spring system composite of a spring unit, such as a positive Belleville spring, and other positive spring components of the automotive starting clutch in which the actuator of the invention is used. For example, in a conventional automotive clutch disc assembly that includes a cushioning plate, elasticity in the clutch disc assembly or in the back plate that provides a reaction to clutch actuating force, may combine with a supplied positive spring unit to provide the positive spring system.

In accordance with the invention, the clutch actuator includes a negative Belleville spring incorporated in a diaphragm having a configuration essentially the same as a conventional clutch diaphragm spring. As such, the diaphragm has an outer annulus to define the negative Belleville spring, and a plurality of radial control fingers extending inwardly from the outer annulus, the outer annulus having an outer periphery engageable with the pressure plate and an inner fulcrum edge. Also, the diaphragm is supported radially in axial alignment on the backplate, but unlike the conventional clutch diaphragm, the inner fulcrum edge of the diaphragm is free to float or move axially relative to the backplate. A positive spring unit is arranged in series with the negative Belleville spring between the inner fulcrum edge and the backplate. Also, the positive spring unit and the negative Belleville spring of the diaphragm act between the backplate 12 and the pressure plate 14 to clamp the disc assembly 16 between the pressure plate 14 and the flywheel friction surface 10 when the clutch is engaged.

In the embodiment illustrated in FIGS. 1A–3, the actuator is shown to include a diaphragm, generally designated by the reference numeral 22, having a continuous outer annulus 24 delineated by an outer peripheral edge 26 in contact with a fulcrum 14f on the pressure plate 14 and an inner fulcrum edge 28, and defining a negative Belleville spring. Integral control fingers 30 extend radially inward from the fulcrum edge 28 to a circular array of inner finger ends 31. As shown most clearly in FIG. 3, a circular array of holes 32 are provided in the region of the inner fulcrum edge 28 of the annulus 24. Slots 34 extend from the holes 32 to the ends 31 of the illustrated control fingers 30.

Figure 1B:
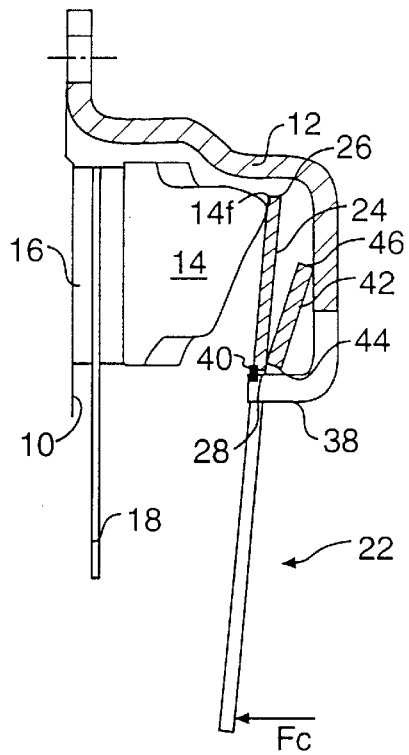
Figure 1C:
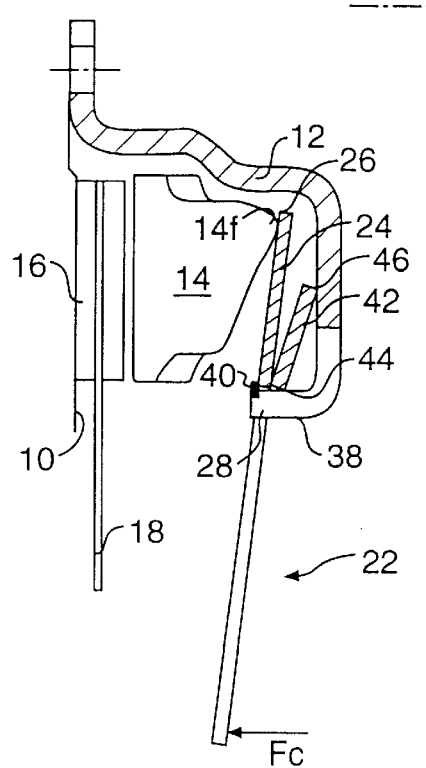

As shown in FIGS. 1A–1C, the backplate 12 is formed at its inner periphery with tabs 38 projecting axially in the direction of the flywheel 10. At least three such tabs 38 are formed in the backplate and extend through corresponding ones of the holes 32 in the diaphragm 22. At the inner distal ends of the tabs 38, retainer stops 40 are provided. The retainer stops 40 may be provided by a continuous ring or by individual stop lugs on each of the tabs 38. The tabs 38 thus function to retain the diaphragm in radial alignment with other components of the clutch. Between the stops 40 and the backplate 12, the inner fulcrum edge 28 of the diaphragm is free to float or move axially. However, the stops 40 serve to limit such floating movement and provide a fulcrum to fully open the clutch in a manner described below.

A positive Belleville spring 42 is also supported by the tabs 38. The positive Belleville spring is of annular configuration to provide a circular inner edge 44 and a circular outer edge 46. The tabs support the positive Belleville spring 42 at its inner edge 44, in this embodiment, so that the inner edge 44 is engageable by the fulcrum edge 28 of the negative Belleville spring annulus 24. The outer edge 46 of the positive Belleville spring 42 engages the backplate 12 as shown.

Figure 2:
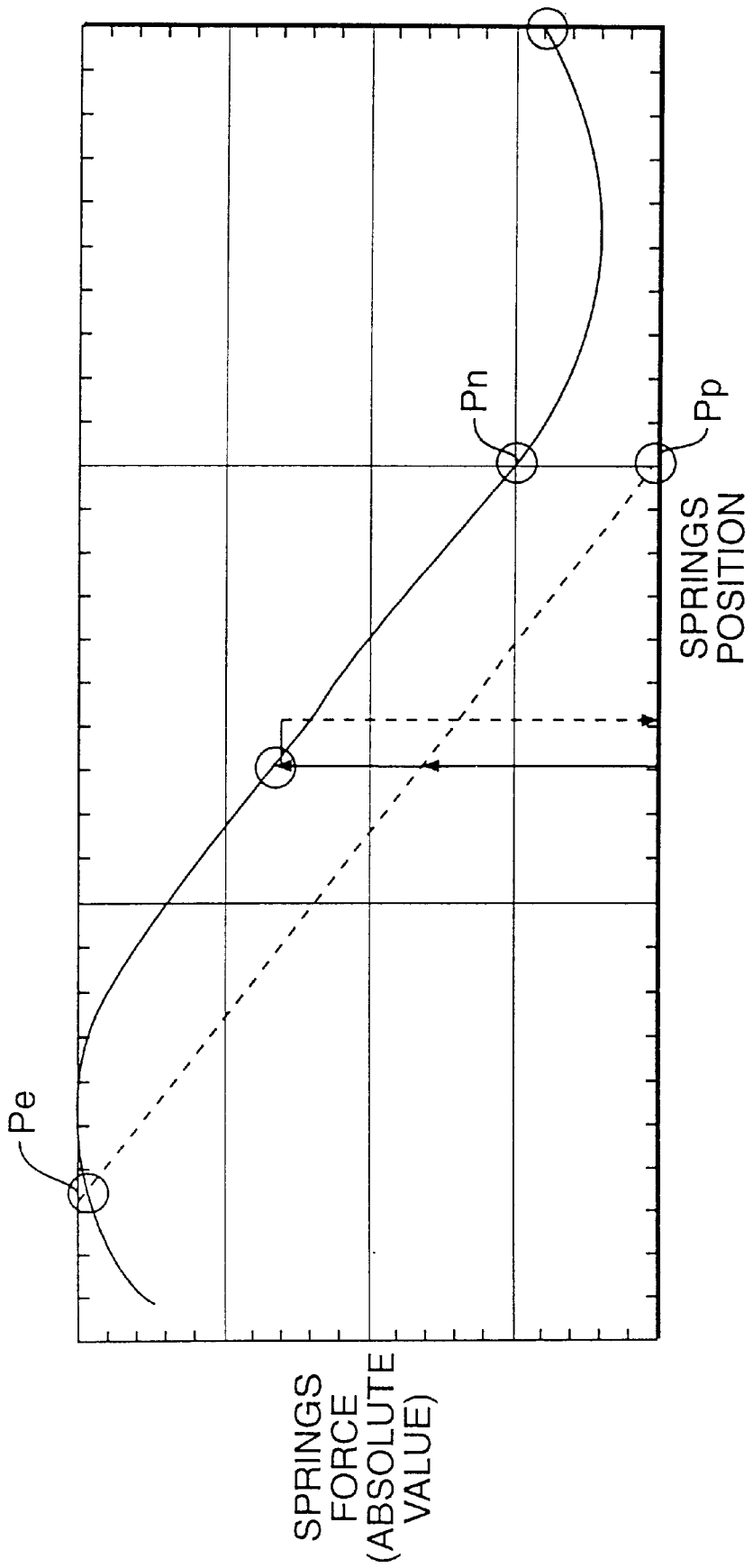
FIG. 2 is a graph showing force-deflection curves of springs used in the embodiment of FIGS. 1A–1C.

In accordance with the present invention, the negative Belleville spring has a negative force/deflection ratio related to the positive force/deflection ratio so that the positive spring unit and the negative Belleville spring oppose each other with a substantially constant force difference throughout a range of actuating force extending between minimum and maximum values. In FIG. 2, the force deflection characteristics of the negative Belleville spring and the positive spring unit are represented respectively by solid-line and dash-line curves. In particular, units of force on the ordinate of the curves are absolute values of force. The units on the abscissa of the curves, however, are units of spring travel resulting from relative values of defection of the positive and negative springs. The vertical distance between the two curves represents a difference in force exerted by the respective springs at common values of deflection. The points Pn, Pp represent a minimum value in a range of actuating force extending to a maximum value at the point Pe. Also, throughout the range of actuation between the points Pn, Pp and the point Pe, the positive spring unit is loaded so that the absolute values of force between the negative Belleville spring and the pressure plate and of force between the positive spring unit and the backplate remain substantially equal during actuation of the clutch.

Where the two curves intersect at the point Pe in the graph shown in FIG. 2, the condition of actuating system is as illustrated in FIG. 1A, that is, the clutch is fully engaged because the pressure plate 14 is fully closed against the friction disc assembly 16 and the flywheel surface 10. In this condition, the negative Belleville spring exerts the full energy capacity thereof between the pressure plate 14 and the positive Belleville spring, which, in turn, transfers the load of the negative Belleville spring against the backplate so that the disc assembly 16 is clamped between the pressure plate 14 and the flywheel friction surface 10. Conceptually, and assuming that the clutch in the condition of FIG. 1A is operated by a conventional foot pedal (not shown), the foot pedal would be in its outer position and the automobile in which the clutch was used would be driven under power transmitted by the clutch.

To disengage the clutch from the condition shown in FIG. 1A, a force Fc is applied at the inner ends 31 of the diaphragm fingers 30 and in a direction toward the flywheel surface 10. As depicted in FIG. 2, the magnitude of the control force Fc is function of the difference between the force developed by energy stored in the positive spring unit and the force developed by energy in the negative Belleville spring. Thus, the positive spring unit assists the control force Fc in restoring energy into the negative Belleville spring to release the clutch from the fully closed condition of FIG. 1A.

It will be noted by a comparison of FIG. 1A and FIG. 1B, that as force is restored to the negative Belleville spring, the inner fulcrum edge 28 of the negative Belleville spring annulus 24 moves toward the stop 40. This condition is illustrated in FIG. 1B. In this condition, the positive spring unit 42, represented in FIG. 2 by the dash-line curve, reaches minimal stored force or a relatively relaxed condition at the point Pp. The condition of the clutch at this point is that the pressure plate 14 remains in engagement with the friction disc assembly 16 but under a very low or "kissing" normal force. To fully disengage the clutch to the condition illustrated in FIG. 1C, the control force Fc continues to be applied to pivot the negative Belleville spring about the retainer stop 40 and the clutch is fully disengaged by movement of the pressure plate 14 away from the flywheel surface 10 under a bias in conventional leaf spring straps (not shown). At this point in the conceptualized clutch pedal analogy, the pedal is being retained in the clutch-open position by a foot applied control force.

Upon release of the force applied to the pedal, the conditions of the positive and negative Belleville springs will progress from right to left along the respective curves shown in FIG. 2. In particular, the negative Belleville spring will pivot from the retainer 40 in the condition of FIG. 1C to the condition of FIG. 1B with a substantially reduced loading of the positive spring. As the release of the control force Fc continues to the condition shown in FIG. 1A, the positive spring unit is loaded by the negative Belleville spring until the two springs reach equilibrium at the intersection of the curves at the point Pe in FIG. 2.

Figure 3:
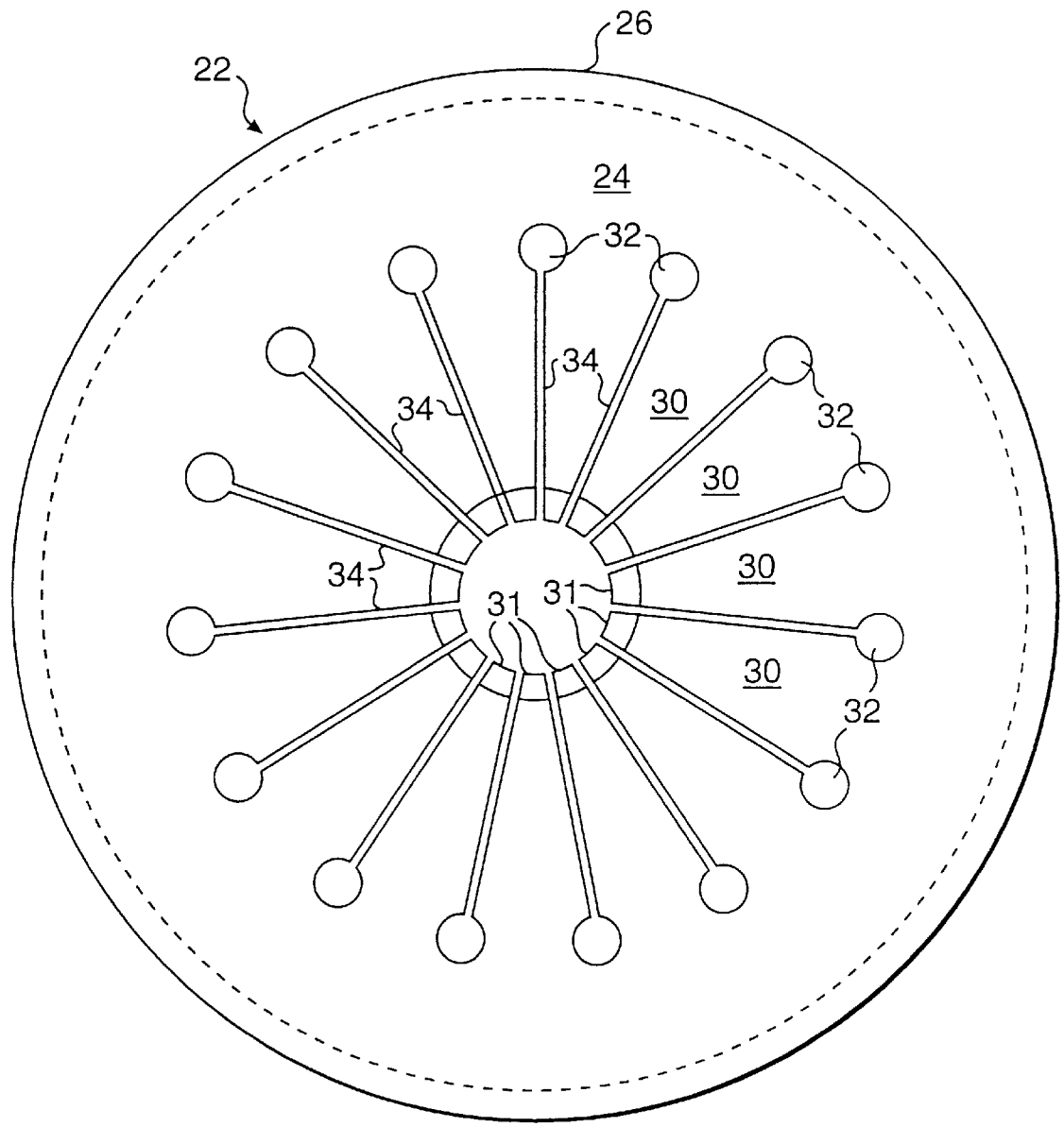
FIG. 3 is a front elevation illustrating a diaphragm component used in the embodiment of FIGS. 1A–1C.
Figure 4A:
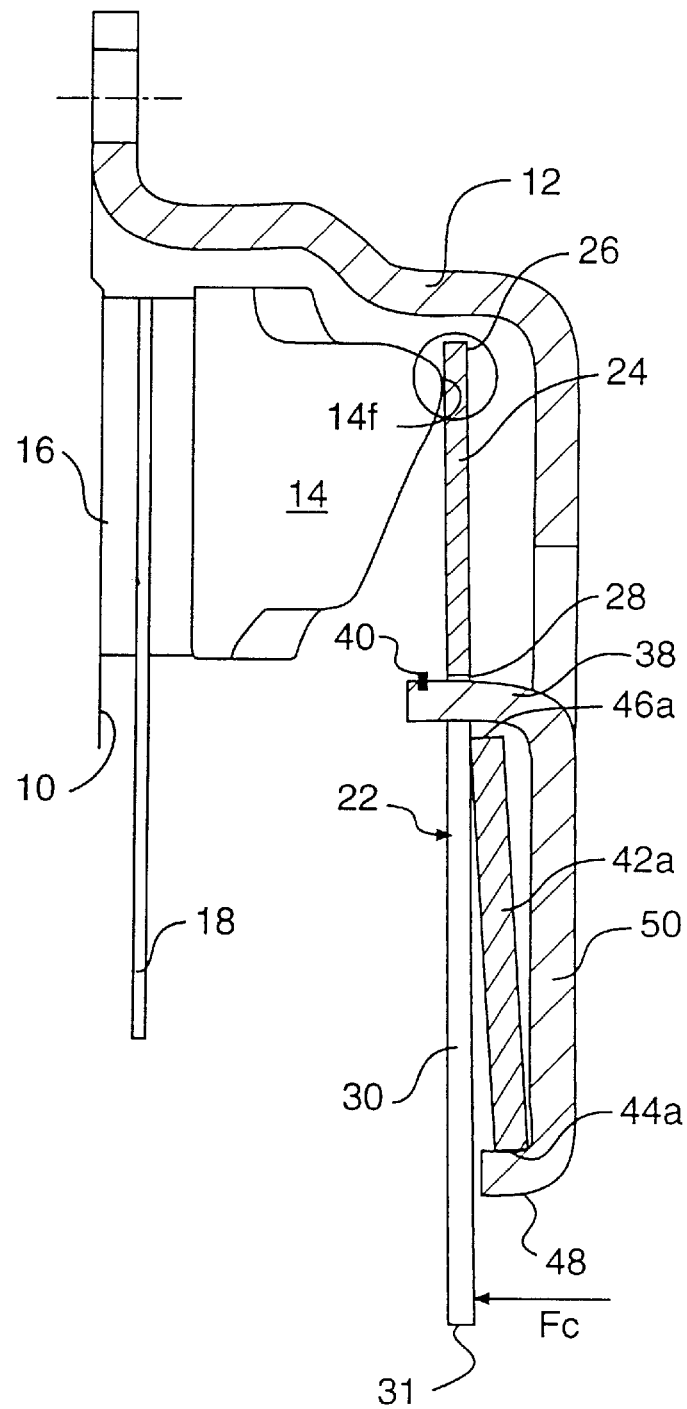
FIGS. 4A, 4B and 4C are fragmentary cross sections illustrating a variation in the embodiment of FIGS. 1A–1C.
Figure 4B:
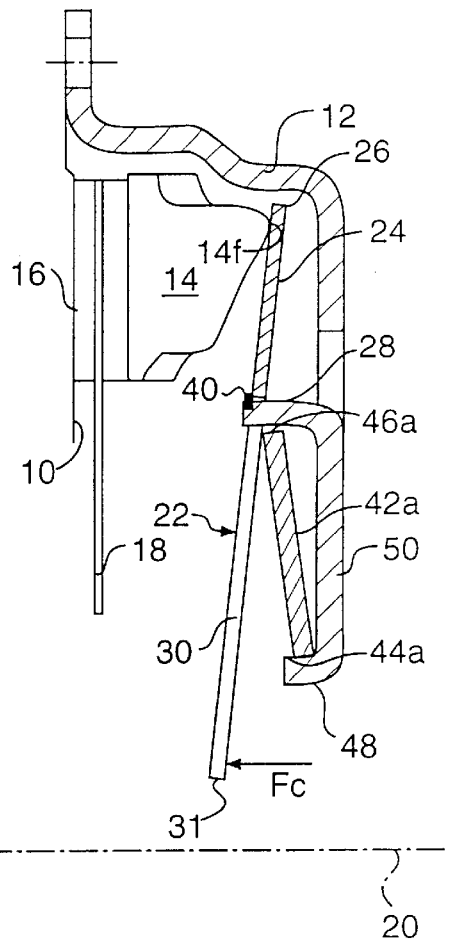
Figure 4C:
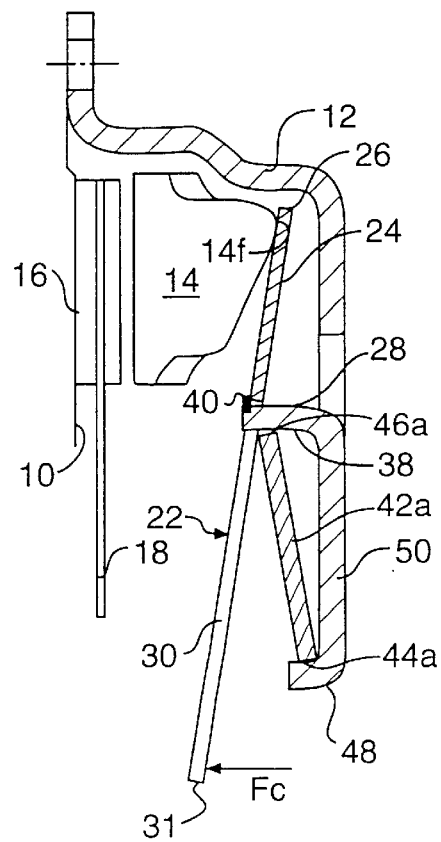

In FIGS. 4A–4C of the drawings, a variation in the embodiment of FIGS. 1A–1C, is illustrated in which the negative Belleville spring is again provided as the outer annulus 24 on the diaphragm 22 shown in FIG. 3. In this instance, the positive Belleville spring 42a is positioned radially inside of the tabs 38 and inside of the annulus 24 of the negative Belleville spring, and is supported by a flange 48 on an inward extension 50 of the backplate 12. Thus, the outer edge 46a of the positive spring unit 42a engages the fulcrum edge 28 of the diaphragm and the inner edge 44a engages the backplate 12. The variation of FIGS. 4A–4C operates substantially identically to that described above with reference to FIGS. 1A–1C.

Figure 5A:
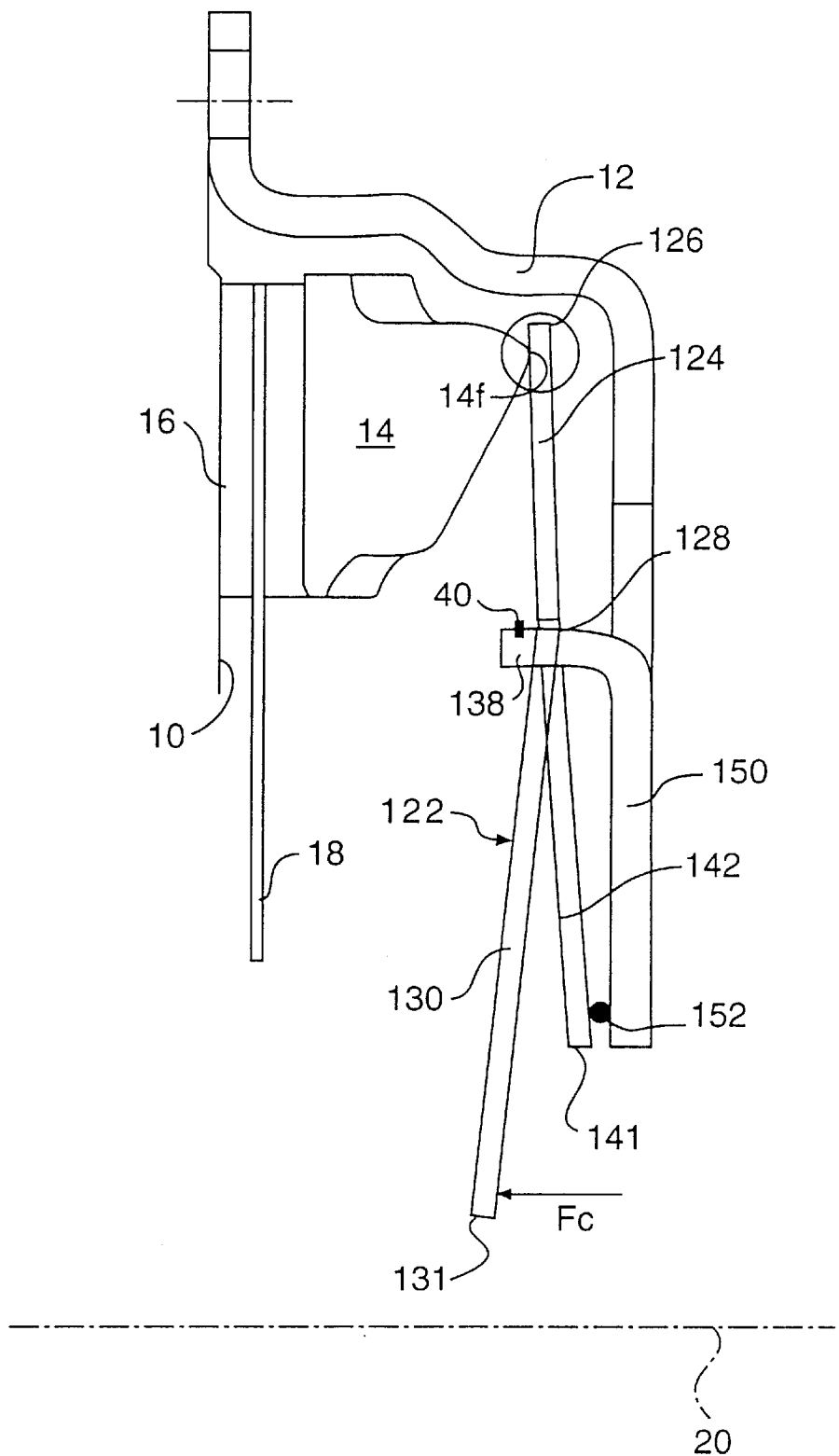
FIGS. 5A–5C are fragmentary cross-sectional views illustrating the components of a second embodiment of the invention in different conditions of operation.
Figure 5B:
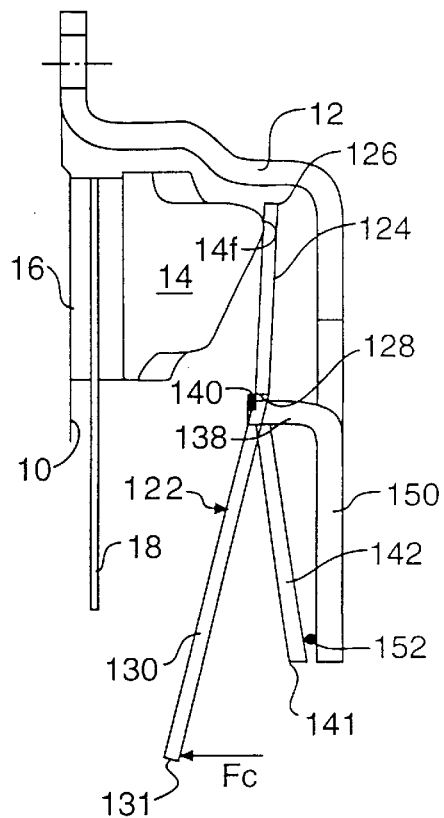
Figure 5C:
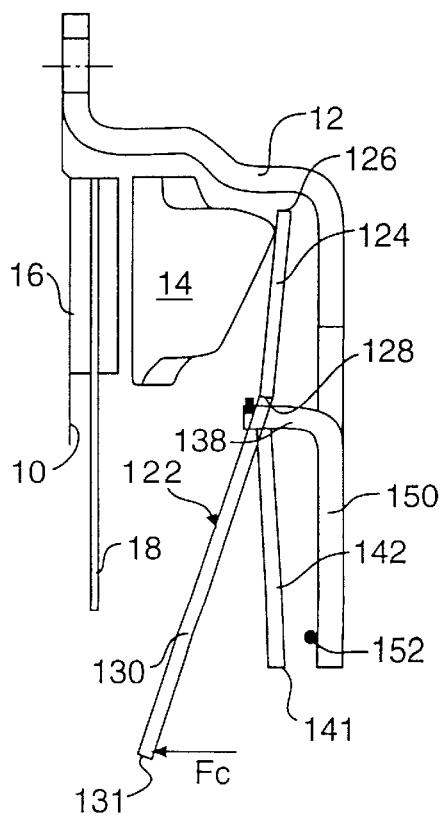
Figure 6:
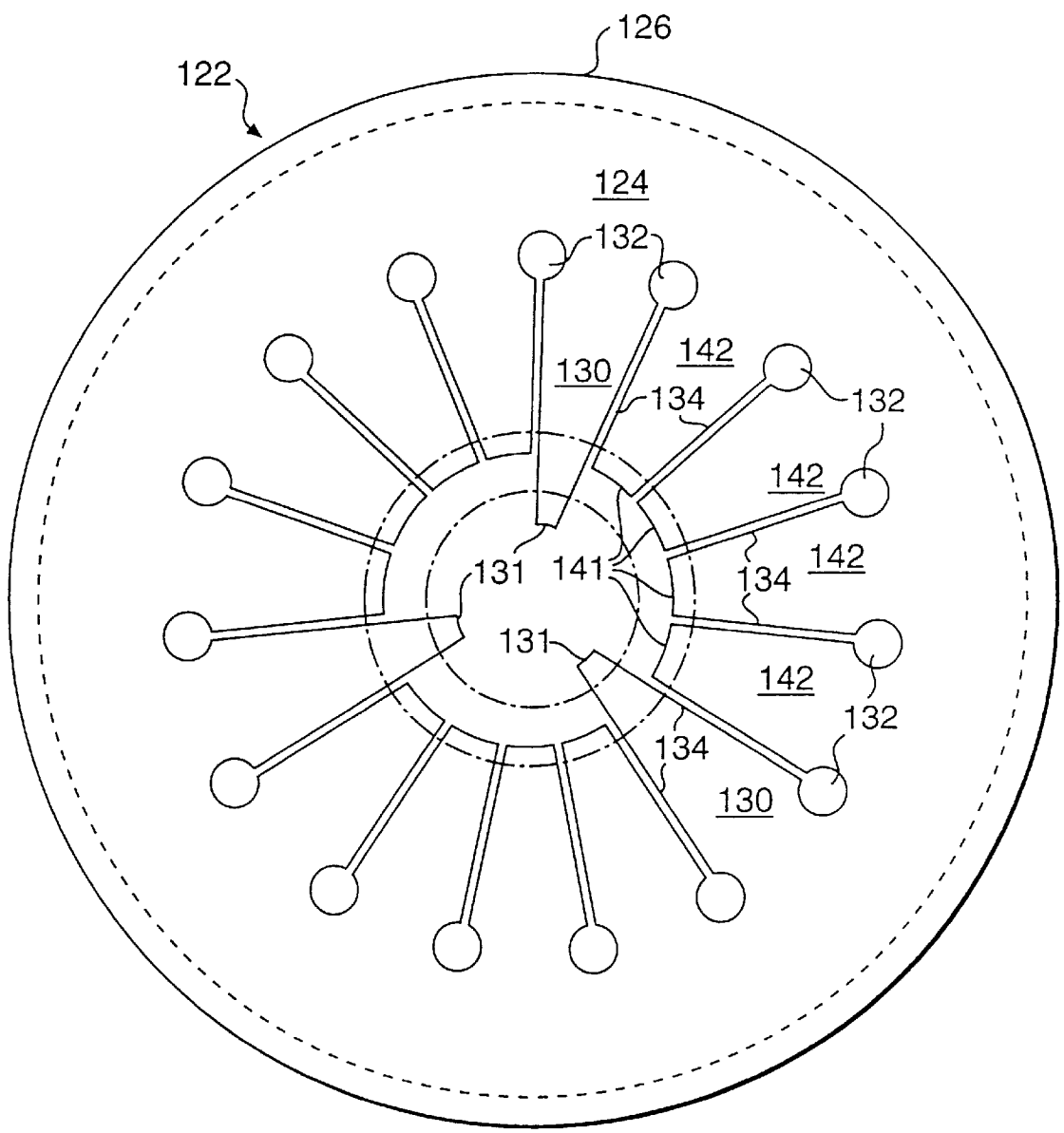
FIG. 6 is a front elevation illustrating a diaphragm used in the embodiment of FIGS. 5A–5C.

In a second embodiment of the invention illustrated in FIGS. 5A–6, the positive spring unit is integrated with the negative Belleville spring in a common diaphragm 122. Again, the negative Belleville spring is formed as an outer annulus 124 of the diaphragm and having an outer peripheral edge 126 in contact with the fulcrum 14f on the pressure plate 14, and an inner fulcrum edge 128. As shown in FIG. 6, the diaphragm 122 has a circular array of holes 132 in the region of the inner fulcrum edge 128 and from which slots 134 extend to separate the inner portion of the diaphragm 122 into a plurality of discrete radiating fingers. In this embodiment, however, three of the illustrated fingers 130 extend to inner ends 131 located inwardly beyond inner ends 141 of the remaining fingers 142.

As shown in FIG. 5C, for example, the fingers 130 are bent forwardly of the diaphragm annulus 124, or toward the pressure plate 14, and function as control fingers for releasing and restoring energy from and to the negative Belleville spring formed by the annulus 124. The remaining, relatively short fingers 142 are bent rearwardly, or toward the backplate 12, and serve as positive leaf springs.

The diaphragm 122 is again supported radially by at least three axial tabs 138 struck out from the backplate 12 to extend through a corresponding at least three of the holes 132. As in the previously described embodiment, a stop ring 140 is fixed at the inner or distal ends of the tabs 138. The backplate 12, in this embodiment, extends inwardly as a bearing wall 150 having a ring 152 positioned to be engaged by the inner ends 141 of the leaf spring fingers 142 when the diaphragm 122 is supported on the tabs 138.

Although operation of the embodiment of FIGS. 5A–6 is the same as the previous embodiment as described above with reference to the graph of FIG. 2, the transfer of energy between the negative Belleville spring formed by the annulus 124 and the positive leaf springs 142 may be appreciated from FIGS. 5A–5C. Thus, in FIG. 5A, the friction disc assembly 16 is fully loaded equally by the negative Belleville annulus 124 and the positive leaf springs 142 exerting force between the backplate 12 and the pressure plate 14 to achieve the state represented by the point Pe in FIG. 2. In FIG. 5B, the control force Fc is applied to attain the state represented by the points Pn and Pp in FIG. 2. in FIG. 5C, the friction disc assembly 16 is fully unloaded with the fulcrum edge 128 against the stop 140 and the positive leaf springs 142 spaced from the backplate bearing wall 150.

Figure 7A:
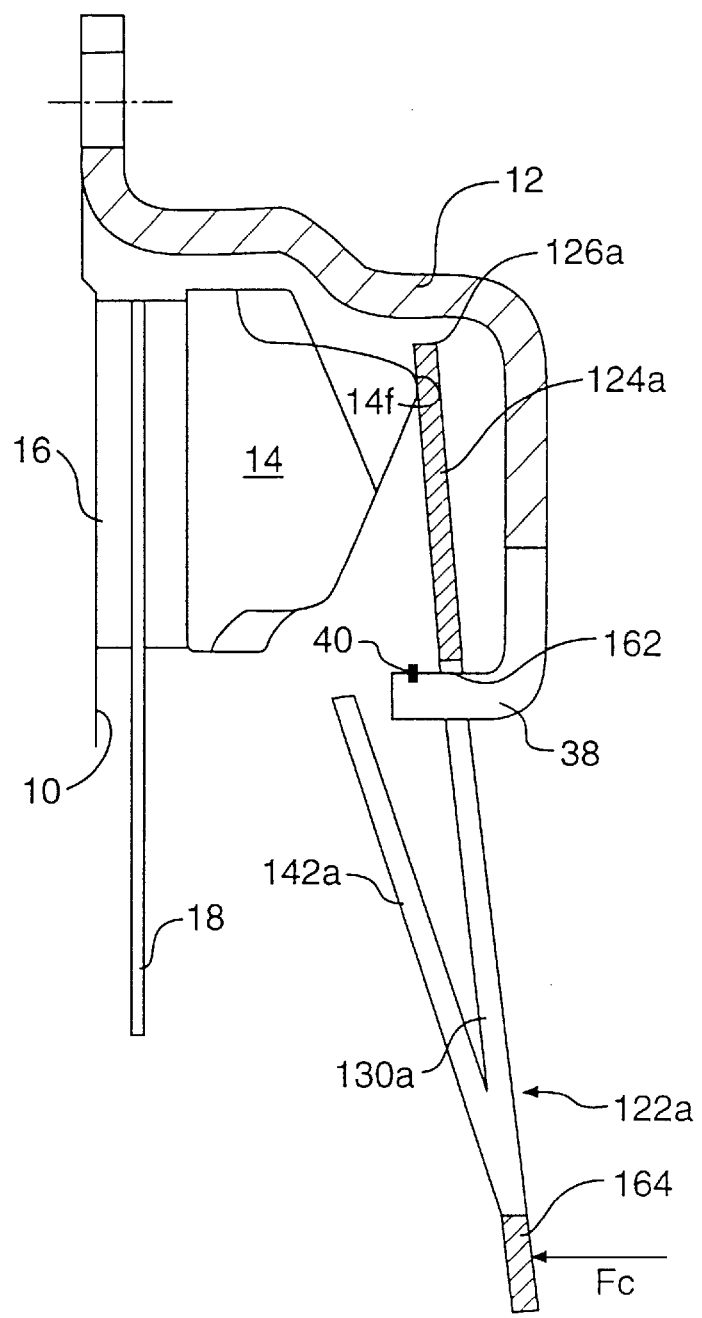
FIGS. 7A, 7B and 7C are fragmentary cross sections illustrating a third embodiment of the invention in different operating conditions.
Figure 7B:
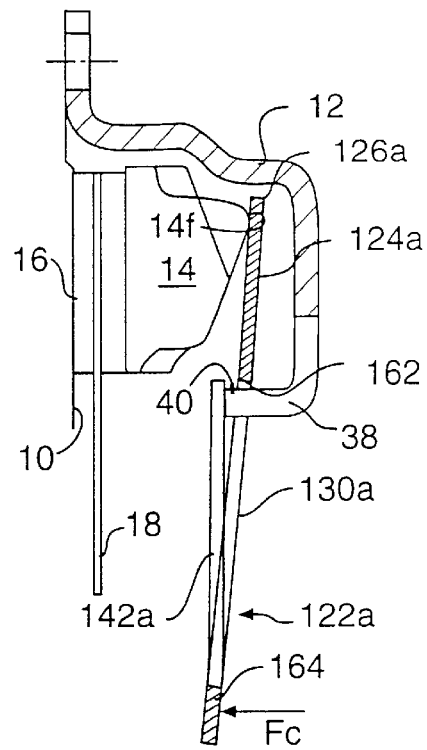
Figure 7C:
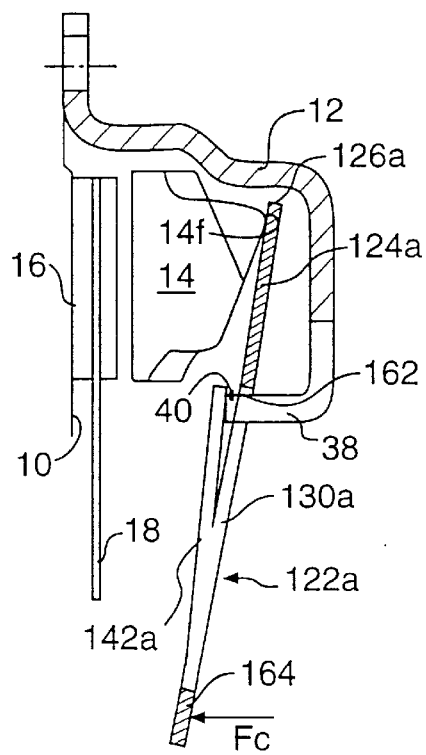
Figure 8:
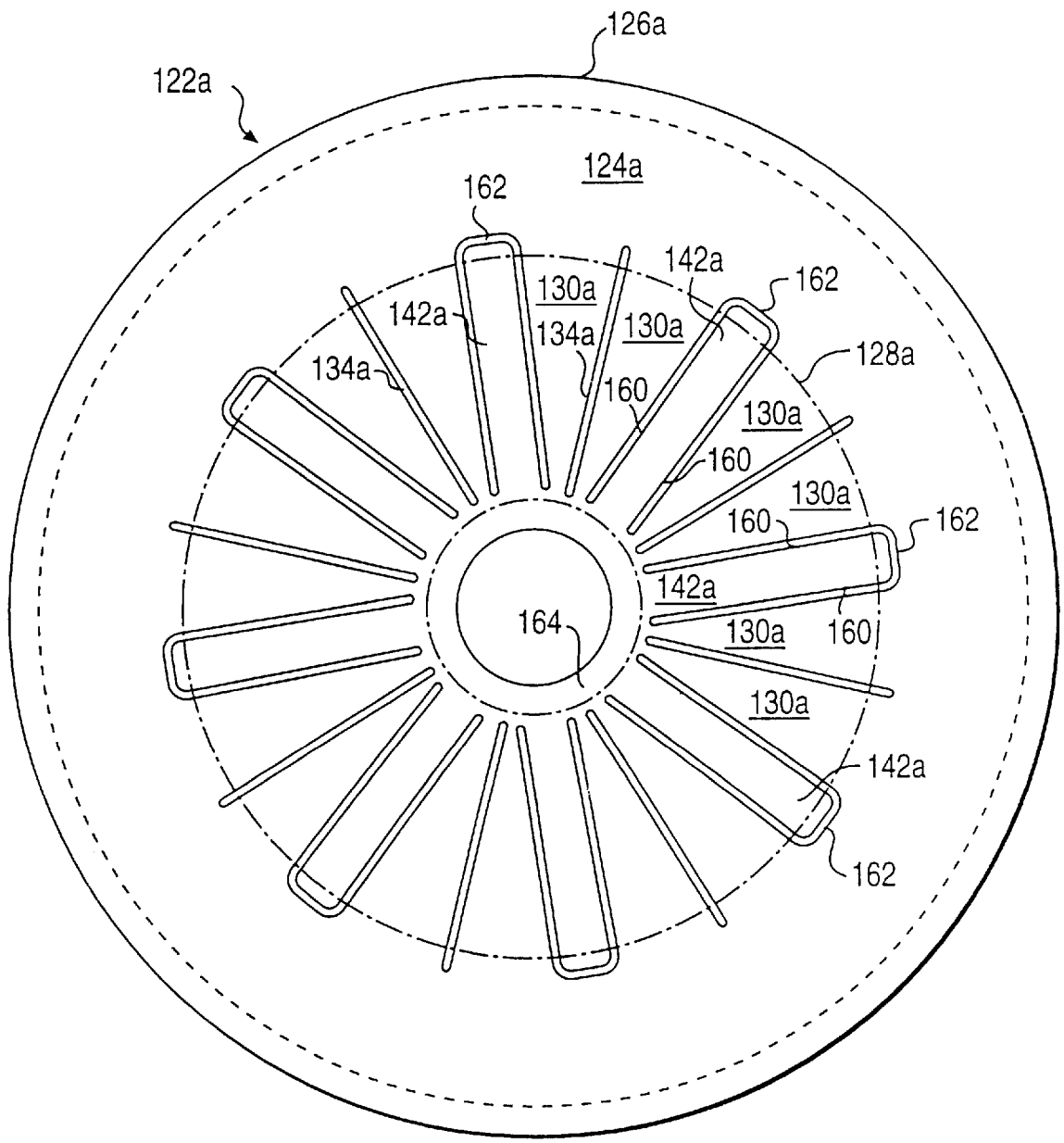
FIG. 8 is a front elevation illustrating a diaphragm used in the embodiment of FIGS. 7A–7C.

In FIGS. 7A–8, a variation of the embodiment of FIGS. 5A–6 is shown in which parts identical or corresponding to parts shown in FIGS. 5A–6 are designated by the same reference numeral with an "a" suffix. Thus, in FIG. 8, a diaphragm 122a is shown as having a continuous outer negative Belleville spring annulus 124a with an outer peripheral edge 126a and an inner fulcrum edge 128a. Inwardly of the annulus 124a, single radial slots 134a alternate with U-shaped slots 160, each of the latter slots having an outer connecting leg 162. The slots 134a and 160 terminate at inner ends defining the outer periphery of a central control ring 164. The arrangement of slots results in a plurality of radial control fingers 130a (sixteen in the illustrated embodiment) between the negative Belleville spring annulus 124a and the central control ring 164. Between each set of two control fingers 130a, positive leaf springs 142a are cantilevered outwardly from the control ring 164.

As shown in FIGS. 7A–7C, the backplate 12 in this embodiment is essentially the same as that of the embodiment of FIGS. 1A–1C, including the axial tabs 38 and stops 40. However, one such tab 38 is provided for each of the positive leaf springs 142a of the diaphragm 122a. The diaphragm 122a is mounted on the tabs 38 by flexing the outer ends of the leaf springs 142a against the distal ends of the tabs 38 so that the diaphragm 122a is supported from the tabs 38 at the outer connecting legs of the U-shaped slots. The condition of the initially mounted diaphragm 122a is essentially that shown in FIG. 7C in which the positive leaf springs 142a undergo minimum deflection. Also, the positive leaf springs could be initially bent to the shape shown in FIG. 7C so as to be at zero deflection in that shape.

Operation of the variation shown in FIGS. 7A–8 is the same as that of FIGS. 5A–6 and will not be further described.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An actuator for a power transmitting friction clutch having a rotatable power input originating in a flywheel, a backplate rotatable with the power input, a pressure plate between the power input and the backplate, and an output connected friction disc assembly between the pressure plate and the flywheel, the actuator comprising:

a diaphragm having an outer annulus defining a negative Belleville spring, and a plurality of radial control fingers extending inwardly from the outer annulus, the outer annulus having an outer periphery engageable with the pressure plate and an inner fulcrum edge;

a positive spring unit in series with the negative Belleville spring between the inner fulcrum edge and the backplate; and means for supporting the diaphragm and the positive spring unit in axial alignment on the backplate while providing unobstructed movement of the inner fulcrum edge of the diaphragm to load and unload the positive spring unit so that the absolute values of force between the negative Belleville spring and the pressure plate and force between the positive spring unit and the backplate remain substantially equal during actuation of the clutch.

2. The actuator of claim 1, wherein the positive spring unit is a positive Belleville spring having inner and outer edges.

3. The actuator of claim 2, wherein the inner edge of the positive Belleville spring engages the fulcrum edge of the outer annulus of the diaphragm and the outer edge of the positive Belleville spring engages the backplate.

4. The actuator of claim 2, wherein the outer edge of the positive Belleville spring engages the fulcrum edge of the outer annulus of the diaphragm and the inner edge of the positive Belleville spring engages the backplate.

5. The actuator of claim 1, wherein the positive spring unit is integrated with the diaphragm.

6. The actuator of claim 5, wherein the positive spring unit comprises a plurality of spring fingers lying between the control fingers and having inner and outer ends, one of the inner and outer ends of the spring fingers engaging the backplate and the other of the inner and outer ends of the spring fingers being joined to the diaphragm.

7. The actuator of any one of claims 1, 2, 3, 4, 5, or 6, wherein the means for supporting the diaphragm and the positive spring unit comprises axial projections on the backplate extending from proximal to distal ends toward the pressure plate.

8. The actuator of claim 7 including a stop at the distal ends of the axial projections to limit movement of the inner fulcrum edge of the diaphragm outer annulus toward the pressure plate.

9. The actuator of any one of claims 1, 2, 3, 4, 5, or 6, wherein the positive spring unit has a positive force/deflection ratio and is initially in an energy receiving condition and the negative Belleville spring has a negative force/deflection ratio and is initially in a loaded energy storing condition, so that movement of the control fingers effects a transfer of stored energy from the negative Belleville spring to the positive spring, thereby to apply a range of applied force between the backplate and the pressure plate, the range of applied force varying between minimum and maximum values of applied force, and the negative and positive force deflection ratios being related so that the absolute values of the force deflection ratios differ by a control force in the control fingers that remains substantially the same for changes in deflection of the positive and negative springs substantially throughout the applied range of forces.

10. The actuator of claim 9, wherein the negative and positive force deflection ratios are further related so that the positive and negative springs are in equilibrium at maximum value of applied force.

* * * * *